United States Patent [19]
Kominami et al.

[11] Patent Number: 6,046,548
[45] Date of Patent: Apr. 4, 2000

[54] METHOD AND APPARATUS FOR OPERATING DISCHARGE LAMP

[75] Inventors: Satoshi Kominami, Katano; Kouji Miyazaki, Hirakata; Shigeru Horii, Takatsuki, all of Japan

[73] Assignee: Matsushita Electric Industrial Co., Ltd., Kadoma, Japan

[21] Appl. No.: 09/162,299

[22] Filed: Sep. 28, 1998

[30] Foreign Application Priority Data

Sep. 29, 1997 [JP] Japan .................................. 9-263205

[51] Int. Cl.⁷ .............................. H05B 41/16; H01J 61/30
[52] U.S. Cl. .......................... 315/246; 315/326; 313/631; 313/635
[58] Field of Search ..................................... 315/246, 326, 315/358, 209 R; 313/631, 634, 635, 638, 639, 489, 113

[56] References Cited

U.S. PATENT DOCUMENTS 5,436,533 7/1995 Fromm et al. ........................... 315/246
5,689,154 11/1997 Barthelmes et al. ..................... 313/635
5,773,937 6/1998 Miyazaki et al. ....................... 315/246

FOREIGN PATENT DOCUMENTS 0399288 11/1990 European Pat. Off. .
62-090843 4/1987 Japan .

Primary Examiner—Haissa Philogene
Assistant Examiner—Wilson Lee
Attorney, Agent, or Firm—Renner, Otto, Boisselle & Sklar

[57] ABSTRACT

Upon generating arc discharge by inputting electric power which changes at a predetermined frequency to the discharge lamp horizontally disposed so as to operate the discharge lamp, the predetermined frequency is a frequency such that the arc discharge is excited substantially in a linear shape by acoustic resonance; and a value of the electric power to be input to the discharge lamp is set so that an input power value per unit inner volume of an arc tube of the discharge lamp falls within a predetermined range which is determined depending on a shape of the arc tube, thereby suppressing a strip-shaped adhesion of a sealed material of the arc tube to a tube wall in the vicinity of a center portion of the arc tube.

22 Claims, 4 Drawing Sheets

| Current waveform | 75kHz sinusoidal wave | 400Hz rectangular wave |
|---|---|---|
| Shape of arc | | |
| State of sealed material | | |

METHOD AND APPARATUS FOR OPERATING DISCHARGE LAMP

BACKGROUND OF THE INVENTION

1. Field of the Invention

The present invention relates to a method and an apparatus for operating a discharge lamp. More particularly, the present invention relates to an operating method and an operating apparatus which generate substantially linear arc discharge by utilizing acoustic resonance in a metal halide lamp. More specifically, the present invention relates to a method and an apparatus for operating a discharge lamp, capable of preventing deterioration in the transparency of an arc tube, which is otherwise caused by the reaction of the arc tube with a sealed material in the arc tube concentrated in a strip shape so as to surround the arc substantially at the center portion of the arc tube, thereby realizing a longer life of the discharge lamp.

2. Description of the Related Art

A metal halide lamp has been receiving attention as a light source for exterior illumination or interior illumination, and particularly as a light source for illuminating a commercial store, in view of its high brightness, high efficiency, excellent color rendering property, long life and the like. Recently, a smaller metal halide lamp which consumes less power has particularly attracted much attention as a light source for an imaging apparatus or a light source for automobile headlights.

In general, when this kind of discharge lamp is operated while being disposed horizontally, the arc is bent upwardly due to the influence of convection resulting from a temperature distribution generated in the arc tube. When the arc is bent, the high temperature arc of about 5000 K is disposed close to the upper side of the arc tube. As a result, a temperature in the upper side of the arc tube becomes higher than that in the lower side of the arc tube. Therefore, transparency in the upper side of the arc tube deteriorates faster than that in the lower side of the arc tube (i.e., transparency is lost), thereby adversely influencing the life of the discharge lamp. Particularly in a small low-power metal halide lamp, a distance between the arc and the arc tube becomes shorter, and thus, the bending of the arc as mentioned above has greater impact on the life of the discharge lamp.

Moreover, when the arc is bent, the shape of the arc becomes asymmetric between the upper side and the lower side thereof. As a result, in the case where the metal halide lamp is used in combination with a reflecting mirror, it is necessary to take such arc bending into consideration upon making an optical design. Consequently, optical designing becomes extremely complex and time-consuming.

As a method for eliminating such arc bending, an operating method which utilizes acoustic resonance has been proposed in Japanese Laid-open Publication No. 7-14684.

Specifically, Japanese Laid-open Publication No. 7-14684 discloses that arc bending caused by the influence of convection can be eliminated as follows. An AC current having a frequency and a waveform such that acoustic resonance in the range of about 10 kHz to about 100 kHz is excited in a radial direction of an arc tube is supplied to a discharge lamp. A frequency $F_V$ of such an AC current is selected so as to satisfy the following relationship between the frequency $F_V$ of the AC current and a frequency $F_R$ of an acoustic wave in a radial direction:

$$n \times 2F_2 = m \times F_R;$$

and $$F_R = 3.83 \, C/(2\pi R);$$

wherein n and m are integers; C is a sound velocity in a radial direction in the arc tube; and R is an inner diameter of the arc tube. It is described that the arc bending due to the influence of convection can be eliminated by following the above scheme.

Acoustic resonance is a phenomenon caused by the generation of a standing wave of a compression wave in the arc tube when a natural frequency of a discharge lamp, determined depending on a sealed material in the arc tube and the shape of the arc tube, becomes substantially equal to a frequency of a periodic change in electric power which is input to the discharge lamp. In general, such acoustic resonance may cause instability or extinction of arc, the bursting of arc tube, or the like. Therefore, conventionally, it has been typically attempted to avoid the generation of acoustic resonance.

In general, there are three kinds of modes in acoustic resonance, i.e., a radial direction mode, an axial direction mode, and a circumferential direction mode. The method disclosed in Japanese Laid-open Publication No. 7-14684 utilizes acoustic resonance in a radial direction among the above-mentioned three modes.

According to the study made by the inventors of the present application, however, it was confirmed that a satisfactory operating condition of a discharge lamp is not always realized even when the operating method which utilizes the acoustic resonance as disclosed in Japanese Laid-open Publication No. 7-14684 is employed.

SUMMARY OF THE INVENTION

A method for operating a discharge lamp of the present invention includes the step of generating arc discharge by inputting electric power which changes at a predetermined frequency to the discharge lamp horizontally disposed so as to operate the discharge lamp. The predetermined frequency is a frequency such that the arc discharge is excited substantially in a linear shape by acoustic resonance. And a value of the electric power to be input to the discharge lamp is set so that an input power value per unit inner volume of an arc tube of the discharge lamp falls within a predetermined range which is determined depending on a shape of the arc tube, thereby suppressing a strip-shaped adhesion of a sealed material of the arc tube to a tube wall in the vicinity of a center portion of the arc tube.

An operating apparatus of a discharge lamp of the present invention allows the discharge lamp to be operated by generating arc discharge with an input of electric power which changes at a predetermined frequency to the discharge lamp horizontally disposed. The predetermined frequency is a frequency such that the arc discharge is excited substantially in a linear shape by acoustic resonance. And a value of the electric power to be input to the discharge lamp is set so that an input power value per unit inner volume of an arc tube of the discharge lamp falls within a predetermined range which is determined depending on a shape of the arc tube, thereby suppressing a strip-shaped adhesion of a sealed material of the arc tube to a tube wall in the vicinity of a center portion of the arc tube.

The predetermined range may be a range expressed as $P/V \leq 1.4$ (W/mm$^3$) when defined by a straight line through an origin where $P=V=0$ on a coordinate plane expressed by an inner volume V (mm$^3$) of the arc tube and electric power P (W) which is input to the discharge lamp during rated operation.

The shape of the arc tube may be substantially a rotating ellipsoid whose longitudinal axis is substantially parallel to an axis of an electrode; and the sealed material of the arc tube may include at least metal halide.

The operating apparatus may further include a ballast circuit, which in turn may include: a DC power supply circuit; an inverter circuit for converting a DC output of the DC power supply circuit to an AC output; a reactance element which is connected to the inverter circuit so as to receive the AC output, and limits an AC current to be supplied to the discharge lamp; and a high-voltage pulse generating circuit for supplying a starting pulse to the discharge lamp, which is connected between the reactance element and the discharge lamp.

In one embodiment, the ballast circuit has a detecting section for detecting a strip-shaped adhesion of the sealed material to the tube wall of the arc tube while the discharge lamp is operated; and the ballast circuit controls electric power to be supplied to the discharge lamp depending on an output of the detecting section.

The ballast circuit may define an upper limit for the electric power to be supplied to the discharge lamp.

The detecting section may be a light receiving section disposed in the vicinity of the tube wall in the center portion of the arc tube.

The shape of the arc tube may satisfy a relationship of $D/L \leq$ about 0.5 wherein D is an inner diameter thereof and L is a length thereof.

An inner volume V of the arc tube may be about 50 mm$^3$ or less.

The shape of the arc tube may have a length L in the range of about 6 mm to about 9 mm and an inner diameter D in the range of about 2 mm to about 4 mm. More specifically, the shape of the arc tube may have an inner diameter D of about 3 mm and a length L in the range of about 6 mm to about 9 mm. Alternatively, the shape of the arc tube may have a length L of about 7.5 mm and an inner diameter D in the range of about 2 mm to about 4 mm.

The predetermined frequency may be in the range of about 100 kHz to about 200 kHz.

Thus, the invention described herein makes possible the advantage of providing a method and an apparatus for operating a discharge lamp, capable of generating a linear arc discharge and preventing a sealed material in an arc tube from adhering in a strip-shape to a center portion of the arc tube which tends to cause loss of transparency of the portion of the arc tube, thereby realizing a longer life of the discharge lamp.

This and other advantages of the present invention will become apparent to those skilled in the art upon reading and understanding the following detailed description with reference to the accompanying figures.

DESCRIPTION OF THE PREFERRED EMBODIMENTS

Hereinafter, the results of operating experiments conducted by the inventors of the present application will be described for the purpose of confirming and discussing the problems of the operating method which generates linear arc discharge by utilizing acoustic resonance in a radial direction.

It should be noted that in this specification, the expression "starting the lamp" means to start the lightening of the lamp (i.e., to ignite the lamp).

Figures 5, 6:
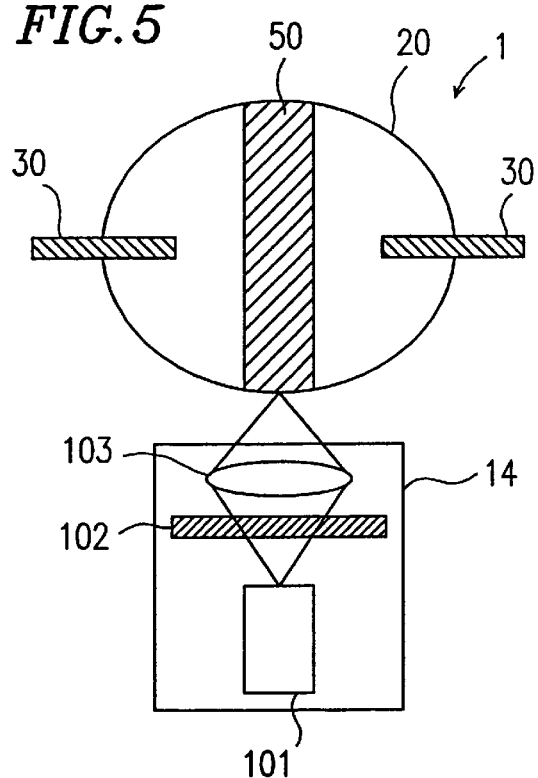
FIG. 5 schematically shows the structure of a light receiving section contained in the operating apparatus shown in FIG. 4.
FIG. 6 schematically shows the shape of generated arc 40 and the state of sealed iodine in each case where a horizontally disposed arc tube is supplied with a sinusoidal AC current of about 75 kHz and a rectangular wave AC current of about 400 Hz to be operated.

FIG. 6 schematically shows shapes of generated arc 40 and existing conditions of liquid iodine 50 which remains unevaporated inside an arc tube 20, when a metal halide lamp, in which mercury, xenon, and Sc—Na type iodine are sealed in the arc tube 20 substantially in the form of a rotating ellipsoid with an inner diameter of about 2.7 mm and a length of about 7.4 mm, is horizontally disposed. The metal halide lamp is operated at the output of about 35 W by supplying a sinusoidal AC current of about 75 kHz or a rectangular wave AC current of about 400 Hz between electrodes 30. Operation with a sine-wave of about 75 kHz allows the arc 40 to become substantially linear in the 35 W metal halide lamp. Operation with a rectangular wave of about 400 Hz is one example of conventional operating methods in which the arc 40 is bent.

As schematically shown in FIG. 6, according to the study made by the inventors of the present application, it was confirmed that the operation with the rectangular wave of about 400 Hz differs from the operation with the sine-wave of about 75 kHz in the shape of the generated arc 40 in the manner as described above and the adhering condition to the arc tube 20 of the liquid iodine 50 remained unevaporated therein.

Specifically, according to the operation with the rectangular wave of about 400 Hz, the Iodine 50 concentrates in the lower portion of the arc tube 20 due to the influence of gravity. In this case, the arc 40 is bent upwardly, and thus the iodine 50 which is concentrated in the lower portion of the arc tube 20 does not cause a significant impact in terms of a light utilization efficiency.

According to the operation with a sine-wave of about 75 kHz, on the other hand, the iodine 50 is adhered substantially in a strip shape so as to surround the arc 40 at the center portion of the arc tube 20. According to the study made by the inventors of the present application, such a phenomenon is caused as follows. The arc 40 takes a linear shape due to acoustic resonance in a radial direction, whereas a density of iodine at the center portion of the arc tube 20 becomes higher due to acoustic resonance in an axial direction, which is another mode of acoustic resonance. As a result, the iodine 50 is liquified on the inner surface of the arc tube which has a temperature lower than that of the gas in the arc tube. Consequently, the iodine 50 is adhered in a strip shape to the tube wall of the arc tube 20.

If the iodine 50 is adhered to the center portion of the arc tube 20 in a strip shape so as to surround the arc 40, chemical reaction between quartz glass constituting the arc tube 20 and the adhered iodine 50 at the adhered portion is accelerated. As a result, transparency in the striped portion of the arc tube 20 is lost. Therefore, lumen flux is reduced, and the life of the discharge lamp is thereby reduced. In addition, since a discharge lamp is used generally in combination with a reflecting mirror, a light utilization efficiency when combined with the reflecting mirror is reduced if a region where transparency is lost is generated in a strip shape at the center portion of the arc tube 20.

The inventors of the present application realized a method and an apparatus for operating a discharge lamp such that the strip-shape adhesion of a sealed material at the center portion of the arc tube as described above is not generated. Hereinafter, it will be described as to why the aforementioned strip-shape adhesion of the sealed material at the center portion of the arc tube is not generated according to the method and apparatus for operating a discharge lamp of this invention.

As described above, it can be considered that the reason why the sealed material is adhered in a strip shape substantially at the center portion of the arc tube is because of acoustic resonance in an axial direction. Accordingly, in order to prevent the strip-shape adhesion of the sealed material, it is necessary to completely eliminate acoustic resonance in an axial direction or to weaken such acoustic resonance to a level sufficient to prevent the strip-shape adhering of the sealed material.

In order to completely eliminate acoustic resonance in an axial direction, the shape of the arc tube may be changed. However, in general, the arc tube of a metal halide lamp is substantially in the form of rotating ellipsoid. With such a shape, acoustic resonances in each of the radial direction, the axial direction, and the circumferential direction are all observed irregularly and in a wide area with respect to a frequency for electric power to be input to the lamp. Therefore, it is extremely difficult to design an arc tube shape such that acoustic resonance in an axial direction can be eliminated.

Thus, a method for lowering axial acoustic resonance to a level sufficient to prevent the strip-shape adhesion of the sealed material substantially at the center portion of the arc tube will be described below.

A force by which acoustic resonance moves a sealed material is proportional to the strength of a compression wave generated inside the arc tube. The compression wave is generated by a change in a pressure caused by a periodic change in an arc temperature, which in turn results from a periodic change in electric power (i.e., a lamp power) to be input to the discharge lamp. In other words, since the force by which acoustic resonance moves a sealed material is proportional to the lamp power, the lamp power may be reduced in order to reduce the force by which acoustic resonance moves the sealed material.

On the other hand, the force for making the arc linear depends on acoustic resonance in a radial direction. When the lamp power is reduced, the force for making the arc linear is also reduced.

Upon comparing the force for making a gaseous arc linear with the force for concentrating sealed liquid material at the center portion of the arc tube, the force which moves liquid is considered to be greater than the force which makes the gaseous arc linear. In other words, it can be considered that there exists an optimum trade-off value for a lamp power which is capable of making arc linear without concentrating the sealed material in a strip shape.

In order to verify the aforementioned ideas, five different kinds of metal halide lamps each having an arc tube substantially in the form of a rotating ellipsoid shown in Table 1 were fabricated, and states of the sealed materials while the lamps were operated were observed.

TABLE 1

| Lamp No. | Inner diameter of arc tube D (mm) | Length of arc tube L (mm) | D/L | Inner volume of arc tube (mm$^3$) |
| --- | --- | --- | --- | --- |
| 1 | 2.0 | 7.4 | 0.27 | 13.7 |
| 2 | 2.7 | 6.4 | 0.42 | 20.7 |
| 3 | 2.7 | 7.4 | 0.36 | 25.0 |
| 4 | 2.7 | 8.4 | 0.32 | 29.3 |
| 5 | 3.4 | 7.4 | 0.46 | 39.6 |

Each of the lamps used in the present experiment is a lamp having an arc tube substantially in the form of an ellipsoid such that the ratio of an inner diameter D of the arc tube to a length L of the arc tube (i.e., D/L) is about 0.5 or less. More specifically, the lamps 1 and 5 are lamps each having a varied inner diameter of the arc tube with respect to the lamp 3. The lamps 2 and 4 are lamps each having a changed length of the arc tube with respect to the lamp 3. A distance between electrodes is constant in each of the lamps 1 through 5. By taking into consideration the fact that in a smaller lamp, a percentage of an area covered with its sealed material with respect to the whole inner surface area of the arc tube becomes larger, each of the lamps 1 through 5 is a small lamp having an inner volume of the arc tube of about 50 mm$^3$ or less.

Mercury, xenon, and Sc—Na type iodine are sealed in the arc tube of each of the lamps 1 through 5. The amount of each sealed component thereof is the same in each of the lamps 1 to 5. A sinusoidal AC current having a frequency such that linear arc discharge is generated is applied to the lamps 1 through 5, respectively, thereby operating the lamps 1 through 5 with several kinds of different lamp powers. The adhering condition of the sealed material to the arc tube in each case was visually observed, In each of the lamps 1 through 5, a frequency of AC power required for generating a substantially linear arc discharge existed in the range of about 100 kHz to about 200 kHz.

Figure 1:
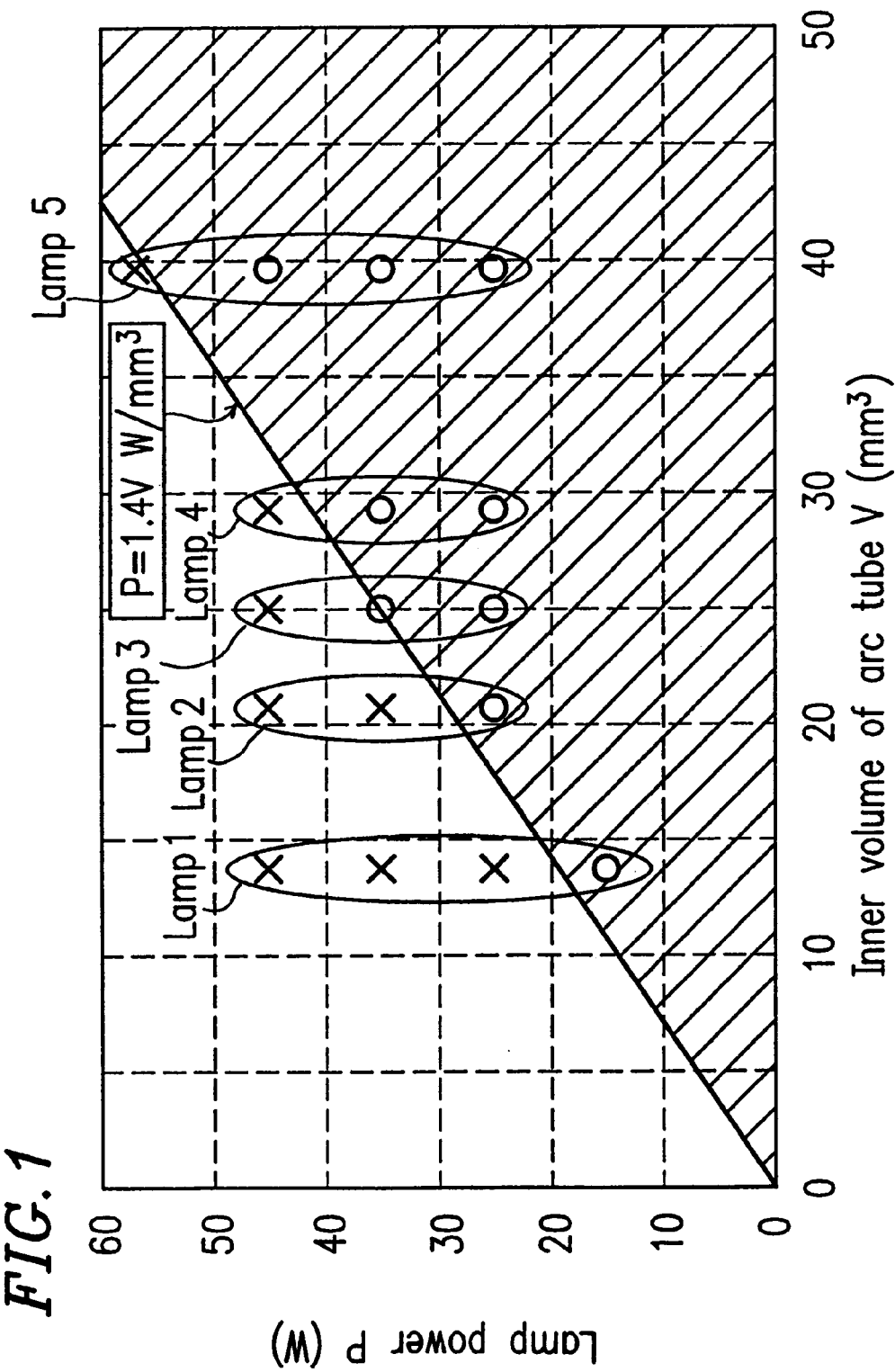
FIG. 1 shows the relationship between a state of sealed iodine while a discharge lamp is operated and a lamp power P and an inner volume V of an arc tube.

FIG. 1 shows the relationship between a state of iodine during the operation, which was obtained in the present experiment, and a lamp power P and an inner volume V of arc tube. In FIG. 1, each plot with the symbol X indicates the case where iodine was adhered to the center portion of the arc tube in a strip shape, while each plot with the symbol ○ represents the case where such adhering in a strip shape did not occur. Symbols surrounded by the same ellipse indicate data for the same lamp, and these lamp numbers correspond to those shown in Table 1.

It can be seen from FIG. 1 that iodine is less likely to concentrate in a strip shape as the lamp power P becomes smaller in each of the lamps 1 through 5, and iodine is less likely to concentrate in a strip shape as the inner volume V of the arc tube becomes larger. Moreover, as the inner volume V of the arc tube increases, iodine is less likely to concentrate in a strip shape even when greater power P is applied to each of the lamps 1 through 5. In other words, by setting a lamp power P per unit inner volume of the arc tube to a predetermined value or less, the adhering of iodine in a strip shape near the center portion of the arc tube can be suppressed.

Such a relationship can be expressed more specifically as follows. If the relationship between lamp power P and inner volume V of the arc tube is defined as a straight line through the origin, it can be appreciated that iodine is not adhered in a strip shape in the range of P=about $1.4 \times V$ (W/mm$^3$) or less (i.e., the hatched region in FIG. 1).

As a reason why iodine is less likely to concentrate in a strip shape when inner volume V of the arc tube is large or lamp power P is small, so that the lamp power P per unit inner volume of the arc tube equals a predetermined value or less, attenuation of a compression wave can be considered. Specifically, as the inner volume of the arc tube becomes greater, a distance between the arc and the arc tube becomes longer. Since the arc is the source for generating the compression wave, a greater distance between the arc and the arc tube allows a compression wave to be attenuated before reaching the tube wall of the arc tube. As a result, the force for concentrating the iodine in a strip shape becomes small.

From the experimental results described above, by setting the optimum relationship between the inner volume V of the arc tube and lamp power P, more specifically, by setting electric power (i.e., a lamp power P) to be supplied for a unit volume of the discharge lamp (i.e., unit inner volume of arc tube) so as to fall within a predetermined region defined by a predetermined function that is defined depending on the shape of the arc tube, it becomes possible to prevent a sealed material from adhering in a strip shape at the center portion of the arc tube while allowing the generation of linear arc discharge.

According to the further study made by the inventors of the present invention, the aforementioned region into which a value of the supplied electric power per unit inner volume of the arc tube does not depend on a distance between the electrodes in the arc tube. Furthermore, the present inventors have confirmed that it becomes possible to prevent a sealed material from adhering in a strip shape at the center portion of the arc tube while allowing the generation of linear arc discharge by allowing a value of the supplied electric power per unit inner volume of the arc tube to satisfy the condition of P=about $1.4 \times V$ (W/mm$^3$) or less (i.e., to fall within the hatched region in FIG. 1), so long as the shape of the arc tube has an inner diameter D of about 3 mm and a length L in the range of about 6 mm to about 9 mm, or a length L of about 7.5 mm and an inner diameter D in the range of about 2 mm to about 4 mm.

Next, some specific but non-limiting examples of the present invention achieved based on the principles as described above which were obtained by the inventors of the present application will be described with reference to accompanying drawings.

EXAMPLE 1

Figure 2:
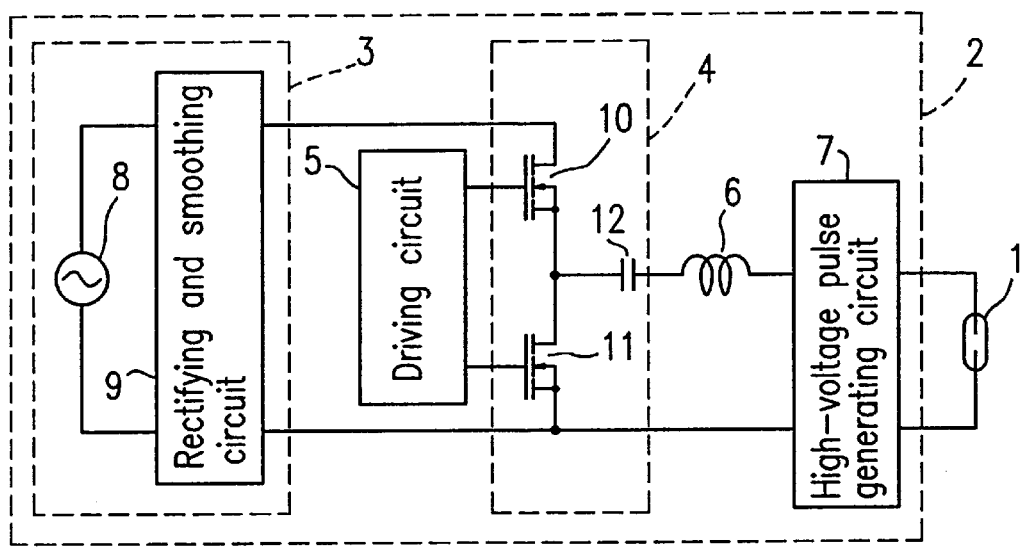
FIG. 2 schematically shows the structure of an apparatus for operating a discharge lamp according to Example 1 of the present invention.

FIG. 2 schematically shows the structure of an apparatus for operating a discharge lamp according to Example 1 of the present invention.

In FIG. 2, reference numeral 1 denotes a metal halide lamp employed as a discharge lamp, and reference numeral 2 represents a ballast circuit for starting and operating the metal halide lamp 1.

The metal halide lamp 1 has an arc tube having an inner volume of about 25 mm$^3$ substantially in the form of rotating ellipsoid with its longitudinal axis being substantially in parallel with an electrode axis. Mercury, xenon, and Sc—Na type iodine as metal halide are sealed in an arc tube. When the metal halide lamp 1 is operated while being horizontally disposed, an AC power frequency for generating substantially linear arc discharge is about 150 kHz.

The ballast circuit 2 includes: a DC power supply circuit 3 for converting an AC power to a DC power by rectifying and smoothing a commercial AC power supply 8 at a rectifying and smoothing circuit 9; a series inverter circuit 4 for converting an output from the DC power supply circuit 3 into an AC form, which includes FETs 10 and 11 and a capacitor 12; a driving circuit 5 for alternately turning ON and OFF the FETs 10 and 11 at a frequency of 75 kHz; a choke coil 6 which is a reactance element for limiting a lamp current; and a high-voltage pulse generating circuit 7 for generating a high-voltage pulse for starting the metal halide lamp 1. The ballast circuit 2 allows the metal halide lamp 1 to operate with a constant power of about 30 W. The power value of 30 W falls in the range satisfying the relationship of $P \leq 1.4 \times V$ (W/mm$^3$) described above with reference to FIG. 1 for lamp power P (W) and Inner volume V of arc tube (mm$^3$).

Next, the operation of the apparatus for operating a discharge lamp according to Example 1 of the present invention will be described.

The metal halide lamp 1 starts operating by receiving a high-voltage pulse from the high-voltage pulse generating circuit 7. The high-voltage pulse generating circuit 7 stops generating a high-voltage pulse when the metal halide lamp 1 starts operating.

Figure 3:
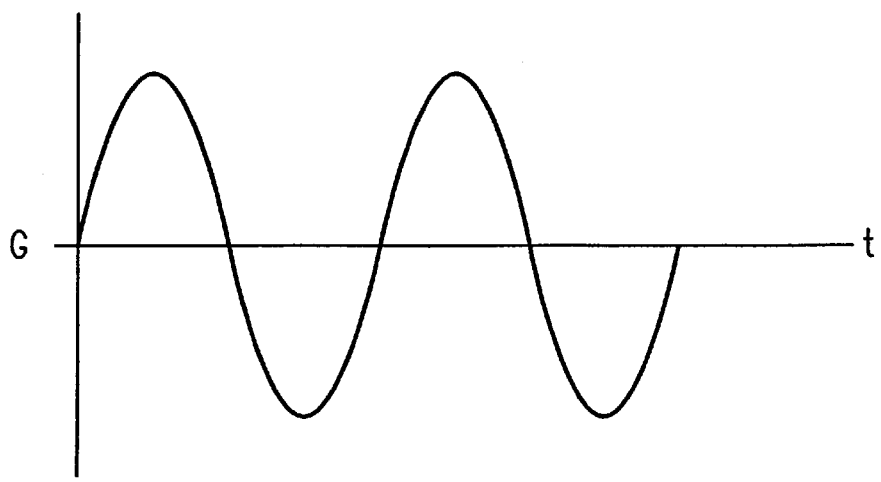
FIG. 3 is a graph schematically showing a waveform of a current output from a ballast circuit contained in the operating apparatus shown in FIG. 2.

When the metal halide lamp 1 starts operating, a rectangular wave AC output of about 75 kHz from the series inverter circuit 4 is applied to a series circuit of the choke coil 6 and the metal halide lamp 1. Such a rectangular wave AC current is subjected to current limiting by the choke coil 6, and the metal halide lamp 1 thereby continues operating. Although the output of the series inverter circuit 4 is a rectangular waveform of about 75 kHz, the waveform of current applied to the metal halide lamp 1 becomes substantially sinusoidal wave form of about 75 kHz as shown in FIG. 3 by the choke coil 6.

When the metal halide lamp 1 is operated by a lamp current with such a sinusoidal waveform, a lamp power P changes at a frequency twice the current wave form, i.e., 75 kHz×2=150 kHz. As described above, when the metal halide lamp 1 used in the structure of FIG. 1 is operated by the application of a lamp power having such a frequency of about 150 kHz, the arc thereof becomes substantially linear. Electric power per unit inner volume of the arc tube supplied to the metal halide lamp 1 is 30 W/25 mm$^3$=1.2 W/mn$^3$, and this value falls within the range shown in FIG. 1 where the adhering of the sealed material in a strip shape is suppressed.

As described above, according to Example 1 of the present invention, mercury, xenon, and Sc—Na type iodine are sealed in the arc tube substantially in the form of a rotating ellipsoid with an inner volume of about 25 mm$^3$. In the metal halide lamp 1 having such an arch tube, arc thereof becomes substantially linear when applied with an AC power with a frequency of about 150 kHz. The metal halide lamp 1 is operated at the constant power of about 30 W by supplying a sinusoidal AC current of about 75 kHz. As a result, the lamp power per unit inner volume of the arc tube supplied to the metal halide lamp 1 becomes about 1.4 W/mm$^3$ or less. Consequently, the metal halide lamp 1 can be operated with the strip-shape adhesion of iodine to the center portion of the arc tube being suppressed while substantially linear arc being generated.

Thus, the loss of transparency in the striped portion at the center portion of the arc tube resulting from the strip-shape adhesion of iodine thereto can be suppressed, thereby achieving long life of the discharge lamp.

EXAMPLE 2

Figure 4:
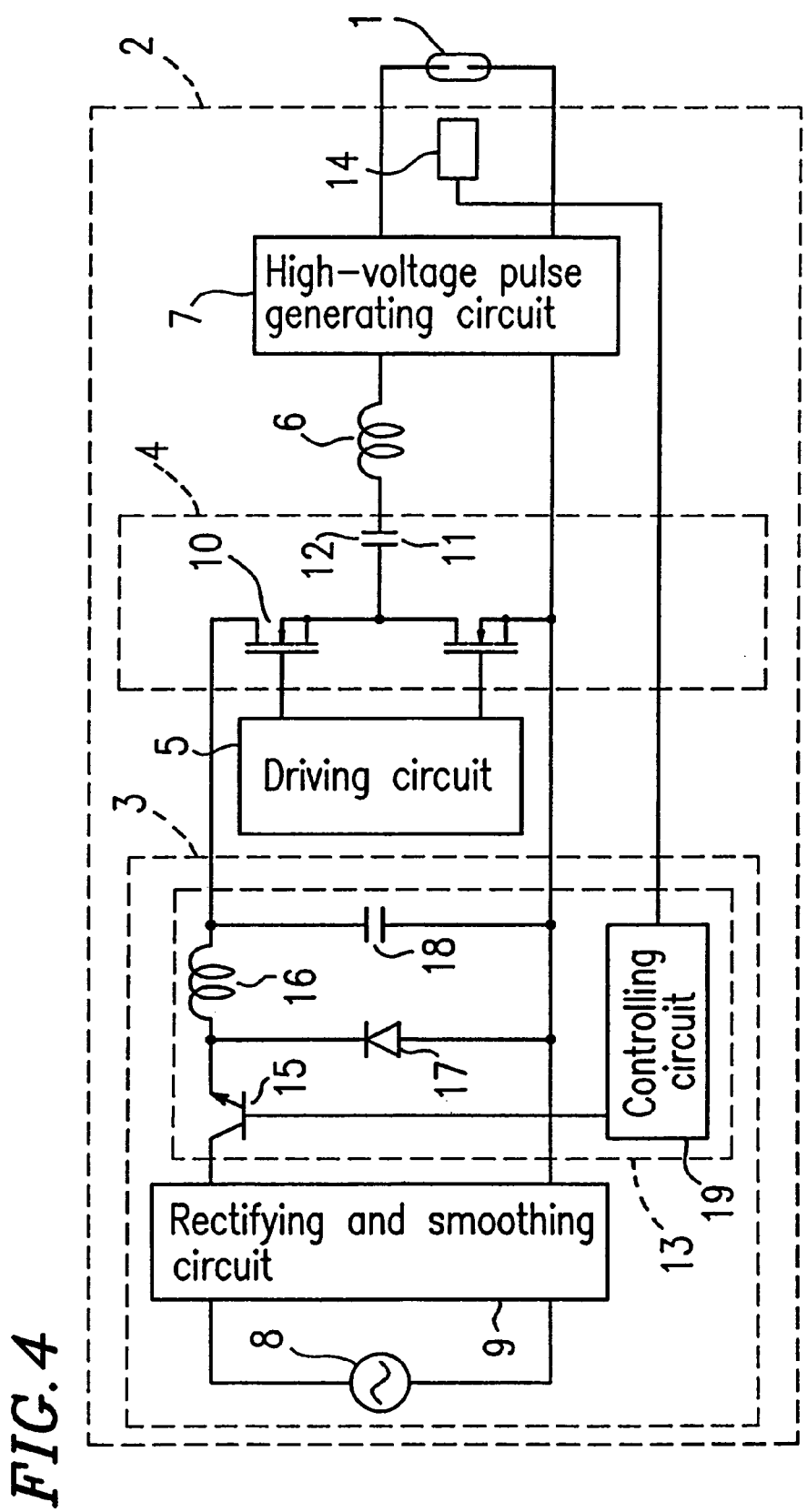
FIG. 4 schematically shows the structure of an apparatus for operating a discharge lamp according to Example 2 of the present invention.

FIG. 4 schematically shows the structure of an apparatus for operating a discharge lamp according to Example 2 of the present invention.

The apparatus structure shown in FIG. 4 differs from the apparatus structure of Example 1 shown in FIG. 2 in that a voltage-reducing chopper circuit 13 for controlling electric power supplied to the metal halide lamp 1 from a DC power supply circuit is further included; and a section 14 for receiving light (hereinafter, referred to as "light receiving section") is disposed in the vicinity of the center portion of an arc tube of a metal halide lamp 1 as a detecting section for detecting the state of a sealed material (i.e., iodine) while the metal halide lamp 1 is operated. The other components shown in FIG. 4 are substantially the same as those in FIG. 2, and a component corresponding to that in FIG. 2 is denoted by the same reference numeral as that in FIG. 2. Thus, the description thereof is herein omitted.

The voltage-reducing chopper circuit 13 includes: a transistor 15, a choke coil 16, a diode 17, a capacitor 18, and a controlling circuit 19. The voltage-reducing chopper circuit 13 controls an output voltage of a DC power supply circuit 3 by controlling a duty ratio of ON and OFF operations of the transistor 15 by means of an output signal of the controlling circuit 19. Consequently, electric power actually supplied to the metal halide lamp 1 is controlled.

The light receiving section 14 is disposed in the vicinity of the arc tube so as to receive light locally transmitted through the area where iodine in the arc tube of the metal halide lamp 1 is adhered to the arc tube in a strip shape, i.e., the center portion of the arc tube. The controlling circuit 19 detects the state of iodine inside the arc tube of the metal halide lamp 1, i.e., detects whether the iodine is adhered to the arc tube in a strip shape, based on a signal from the light receiving section 14. The controlling circuit 19 determines the ON/OFF duty ratio of the transistor 15 so that a lamp power (i.e., a lamp power per unit inner volume of the arc tube) is set so as to prevent the strip-shape adhesion of iodine.

Next, the operation of the apparatus for operating a discharge lamp according to Example 2 of the present invention will be described.

Please note, however, that description regarding a series inverter circuit 4, a driving circuit 5, a choke coil 6, and a high-voltage pulse generating circuit 7 will be herein omitted since operations thereof are the same as those in the operating apparatus of Example 1. Hereinafter, the operations and functions of the voltage-reducing chopper circuit 13 and the light receiving section 14 will be mainly described.

As previously described in connection with Example 1, upon setting conditions such that the metal halide lamp 1 is operated at a power of 35 W, electric power per unit inner volume of the arc tube which is supplied to the metal halide lamp 1 becomes 35 W/25 mm$^3$=1.4 W/mm$^3$, which falls within the range shown in FIG. 1 where the strip-shape adhesion of the sealed material is suppressed. This means that iodine would not adhere to the arc tube in a strip shape. In reality, however, since the inner volume of the arc tube of the metal halide lamp 1 may very due to manufacturing tolerance, the aforementioned condition for the numerical range may fall to be satisfied, resulting in the strip-shape adhesion of iodine.

For example, if the actual inner volume of the arc tube is about 23 mm$^3$, the electric power per unit inner volume of the arc tube which is supplied to the metal halide lamp 1 becomes 35 W/23 mm$^3$=1.5 W/mm$^3$. Accordingly, the numerical condition shown in FIG. 1 for suppressing the strip-shape adhesion of iodine fails to be satisfied.

Thus, according to the present example, the strip-shape adhesion of iodine to the arc tube is detected, and the supply amount of the lamp power is reduced in order to prevent such adhesion of iodine.

Hereinafter, a method for detecting the strip-shape adhesion of iodine will be described.

When light emitted from arc transmits through the arc tube, iodine adhered to the arc tube in a strip shape causes the light to be reflected and absorbed at the adhered portion. As a result, light transmission spectral characteristics are locally changed. In other words, for light with a certain wavelength, the amounts of transmitted light significantly vary between the case where the light is transmitted through the area where iodine is adhered to the arc tube and the case where the light is transmitted through the area where iodine is not adhered to the arc tube. Therefore, by constituting the light receiving section 14 so that a change in the amount of transmitted light for such light with a certain wavelength can be detected, the existence of iodine (i.e., the state as to the adhering of iodine to the arc tube) can be detected.

Specifically, the light receiving section 14 is formed by a photodiode 101, a filter 102, and a lens 103, as shown in FIG. 5. Among light rays generated by arc discharge between electrodes 30, a local light ray transmitted through the portion of the arc tube 20 where iodine 50 is adhered in a strip shape is collected by the lens 103, and received by the photodiode 101 through the filter 102. The iodine sealed in the arc tube 20 of the metal halide lamp 1 according to Example 2 of the present invention displays yellow colored light, and has a property to absorb blue light. Therefore, if iodine is adhered to the arc tube 20 in a strip shape, an amount of blue light among the light rays transmitted through the adhered iodine 50 is significantly reduced. Thus, by measuring the amount of transmitted blue light, it is possible to detect whether the iodine 50 is adhered to the arc tube 20 in a strip shape. Based on such a principle, the light receiving section 14 shown in FIG. 5 employs a blue transmitting filter as the filter 102.

With such a structure, in the case where the iodine 50 is adhered to the arc tube 20 in a strip shape, blue light is hardly contained in the light received by the light receiving section 14. As a result, light is barely input to the photodiode 101, and the output of the light receiving section 14 is therefore almost zero. Consequently, the controlling circuit 19 determines that iodine is adhered in a strip shape, and changes a duty ratio between ON and OFF operations of the transistor 15 so as to allow a smaller lamp power to be supplied to the discharge lamp 1. For example, the metal halide lamp 1 contained in the structure shown in FIG. 4 has the arc tube inner volume of 23 mm$^3$, and therefore, a supplied lamp power may be reduced to about 32 W in order to set the lamp power per unit inner volume of the arc tube to be the aforementioned value of 1.4 W/mm$^3$ or less. With such a control, the ionide 50 once adhered to the arc tube 20 in a strip shape is allowed to come off, so as to be placed in the lower portion of the arc tube 20 due to the influence of gravity.

In the case where no iodine is adhered to the arc tube in a strip shape, on the other hand, light which is input to the light receiving section 14 contains blue light. As a result, the light transmitted through the filter 102 is input to the photodiode 101, and the light receiving section 14 outputs to the controlling circuit 19 a signal proportional to the amount of light input to the photodiode 101. The controlling circuit 19 determines that the strip-shape adhesion of iodine does not occur if a signal from the light receiving section 14 is equal to a predetermined value or greater. Accordingly, the operating condition of the metal halide lamp 1 is maintained without changing the amount of supplied lamp power.

As described above, according to Example 2 of the present invention, the light receiving section 14 detects the state of iodine while the metal halide lamp 1 is operated. If iodine is adhered to the arc tube in a strip shape, the metal halide lamp 1 is controlled to operate by reducing electric power supplied to the metal halide lamp 1 by means of the voltage-reducing chopper circuit 13 so as to suppress the strip-shape adhesion of iodine. As a result, influence of the variation due to the manufacturing tolerance of the metal halide lamp 1 can be absorbed.

Although the metal halide lamp 1 in which mercury, xenon, and Sc—Na type iodine are sealed is used as a discharge lamp in each of the aforementioned examples, the discharge lamp is not limited thereto. For example, any discharge lamp may be used as long as it contains at least a sealed material existing in a liquid form inside the arc tube while the lamp 1 is operated. Specifically, the advantages of the present invention can be achieved when at least metal halide is sealed in an arc tube of the employed discharge lamp.

A waveform of the current applied to the metal halide lamp 1 by the ballast circuit 2 is sinusoidal in each of the aforementioned examples. However, any waveform may be used as long as electric power which periodically changes can be supplied by the current. For example, a triangular waveform, sawtooth waveform, or the like may be used.

Although the inverter circuit 4 is a series inverter circuit containing the FETs 10 and 11 and the capacitor 12 in each of the examples described above, any circuit having a structure capable of performing a DC-to-AC conversion may be used. For example, a full bridge inverter circuit, a half bridge inverter circuit, or the like may be used.

Although the choke coil 6 is used as a reactance element in the aforementioned examples, the reactance element may be structured by a capacitor or a composite circuit of a choke coil and a capacitor. Moreover, any high-voltage pulse generating circuit may be employed as long as it has a structure capable of applying a high-voltage pulse for starting the metal halide lamp 1. For example, the high-voltage pulse generating circuit may have a structure such that a high-voltage pulse is generated by a boosting operation with a transformer, or a structure such that a high-voltage pulse is generated by a resonant circuit of a capacitor and a choke coil.

Although the DC power supply circuit 3 including the commercial AC power supply 8 and the rectifying and smoothing circuit 9 is used in Example 1 of the present invention, any DC power supply circuit may be used as long as it has a structure capable of providing a DC output. For example, a DC power supply circuit having a structure using a battery or a structure which combines a switching power supply with a commercial AC power supply or a DC power supply may be used.

As a detecting section for detecting the state of the sealed material (i.e., iodine) while the metal halide lamp 1 is operated, the light receiving section 14 containing the photodiode 101, the filter 102, and the lens 103 is used in Example 2 of the present invention. However, any other configuration may be used as long as it has a structure capable of detecting whether the sealed material is adhered to the arc tube in a strip shape while the metal halide lamp 1 is operated. For example, the metal halide lamp 1 may be observed using a CCD camera or the like, and the strip-shape adhesion of the sealed material to the arc tube can be detected by image processing. Moreover, although a blue transmitting filter is used as the filter 102, a filter which transmits light of another color may be used as long as it is possible to detect light of such a wavelength that allows a significant difference in the amounts of transmitted light to be observed between the case where iodine is adhered and the case where no iodine is adhered. For example, if a different material is sealed in the arc tube of the metal halide lamp 1, it is necessary to change the filter 102 to transmit light of an appropriate different wavelength.

In Example 2 of the present invention, the DC power supply circuit 3 includes: the commercial AC power supply 8; the rectifying and smoothing circuit 9; the voltage-reducing chopper circuit 13 including the transistor 15, the choke coil 16, the diode 17, and the capacitor 18; and the controlling circuit 19. However, any DC power supply circuit may be used as long as it has a structure capable of varying electric power to be supplied to the metal halide lamp 1. For example, it is possible to employ a structure such that the voltage-reducing chopper circuit 13 in the aforementioned Example 2 is replaced by a voltage-boosting chopper circuit, a polarity-inverted chopper circuit, or the like. Moreover, the portion containing the commercial AC power supply 8 and the rectifying and smoothing circuit 9 may be a DC power supply such as a battery.

As described above, according to the present invention, in the methods and apparatuses for operating a discharge lamp, wherein arc discharge is generated by inputting, to a discharge lamp disposed horizontally, electric power which changes at a predetermined frequency that causes arc discharge to be excited substantially in a linear shape due to acoustic resonance, a value of the electric power to be input to the discharge lamp is set so that an input power value per unit inner volume of the arc tube of the discharge lamp falls within a predetermined range which is determined depending on the shape of the arc tube. Accordingly, it is possible to generate substantially linear arc discharge while preventing the sealed material of the arc tube from adhering to the tube wall at the center portion of the arc tube in a strip shape during the lamp operation. As a result, the loss of transparency at the striped portion of the arc tube resulting from the chemical reaction between the sealed material and the arc tube is prevented, thereby realizing long life of the discharge lamp.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for operating a discharge lamp, comprising the step of generating arc discharge by inputting electric power which changes at a predetermined frequency to the discharge lamp horizontally disposed so as to operate the discharge lamp, wherein the predetermined frequency is a frequency such that the arc discharge is excited substantially in a linear shape by acoustic resonance; and wherein a value of the electric power to be input to the discharge lamp is set so that an input power value per unit inner volume of an arc tube of the discharge lamp falls within a predetermined range which is determined depending on a shape of the arc tube, thereby suppressing a strip-shaped adhesion of a sealed material of the arc tube to a tube wall in the vicinity of a center portion of the arc tube.

2. A method for operating a discharge lamp according to claim 1, wherein the predetermined range is a range expressed as $P/V \leq 1.4$ (W/mm$^3$) when defined by a straight line through an origin where $P=V=0$ on a coordinate plane expressed by an inner volume V (mm$^3$) of the arc tube and electric power P (W) which is input to the discharge lamp during rated operation.

3. A method for operating a discharge lamp according to claim 1, wherein: the shape of the arc tube is substantially a rotating ellipsoid whose longitudinal axis is substantially parallel to an electrode axis; and the sealed material of the arc tube includes at least metal halide.

4. A method for operating a discharge lamp according to claim 1, wherein the shape of the arc tube satisfies a relationship of $D/L \leq$ about 0.5 wherein D is an inner diameter thereof and L is a length thereof.

5. A method for operating a discharge lamp according to claim 1, wherein an inner volume V of the arc tube is about 50 mm$^3$ or less.

6. A method for operating a discharge lamp according to claim 1, wherein the shape of the arc tube has a length L in the range of about 6 mm to about 9 mm and an inner diameter D in the range of about 2 mm to about 4 mm.

7. A method for operating a discharge lamp according to claim 6, wherein the shape of the arc tube has the inner diameter D of about 3 mm and the length L in the range of about 6 mm to about 9 mm.

8. A method for operating a discharge lamp according to claim 6, wherein the shape of the arc tube has the length L of about 7.5 mm and the inner diameter D in the range of about 2 mm to about 4 mm.

9. A method for operating a discharge lamp according to claim 1, wherein the predetermined frequency is in the range of about 100 kHz to about 200 kHz.

10. An operating apparatus of a discharge lamp for operating the discharge lamp by generating arc discharge with an input of electric power which changes at a predetermined frequency to the discharge lamp horizontally disposed, wherein the predetermined frequency is a frequency such that the arc discharge is excited substantially in a linear shape by acoustic resonance; and wherein a value of the electric power to be input to the discharge lamp is set so that an input power value per unit inner volume of an arc tube of the discharge lamp falls within a predetermined range which is determined depending on a shape of the arc tube, thereby suppressing a strip-shaped adhesion of a sealed material of the arc tube to a tube wall in the vicinity of a center portion of the arc tube.

11. An operating apparatus of a discharge lamp according to claim 10, wherein the predetermined range is a range expressed as $P/V \leq 1.4$ (W/mm$^3$) when defined by a straight line through an origin where $P=V=0$ on a coordinate plane expressed by an inner volume V (mm$^3$) of the arc tube and electric power P (W) which is input to the discharge lamp during rated operation.

12. An operating apparatus of a discharge lamp according to claim 10, wherein: the shape of the arc tube is substantially a rotating ellipsoid whose longitudinal axis is substantially parallel to an axis of an electrode; and the sealed material of the arc tube includes at least metal halide.

13. An operating apparatus of a discharge lamp according to claim 10, further comprising a ballast circuit, wherein the ballast circuit includes:
  a DC power supply circuit;
  an inverter circuit for converting a DC output of the DC power supply circuit to an AC output;
  a reactance element which is connected to the inverter circuit so as to receive the AC output, and limits an AC current to be supplied to the discharge lamp; and
  a high-voltage pulse generating circuit for supplying a starting pulse to the discharge lamp, which is connected between the reactance element and the discharge lamp.

14. An operating apparatus of a discharge lamp according to claim 13, wherein:

the ballast circuit has a detecting section for detecting a strip-shaped adhesion of the sealed material to the tube wall of the arc tube while the discharge lamp is operated; and the ballast circuit controls electric power to be supplied to the discharge lamp depending on an output of the detecting section.

15. An operating apparatus of a discharge lamp according to claim 14, wherein the ballast circuit defines an upper limit for the electric power to be supplied to the discharge lamp.

16. An operating apparatus of a discharge lamp according to claim 14, wherein the detecting section is a light receiving section disposed in the vicinity of the tube wall in the center portion of the arc tube.

17. An operating apparatus of a discharge lamp according to claim 10, wherein the shape of the arc tube satisfies a relationship of $D/L \leq$ about 0.5 wherein D is an inner diameter thereof and L is a length thereof.

18. An operating apparatus of a discharge lamp according to claim 10, wherein an inner volume V of the arc tube is about 50 mm$^3$ or less.

19. An operating apparatus of a discharge lamp according to claim 10, wherein the shape of the arc tube has a length L in the range of about 6 mm to about 9 mm and an inner diameter D in the range of about 2 mm to about 4 mm.

20. An operating apparatus of a discharge lamp according to claim 19, wherein the shape of the arc tube has the inner diameter D of about 3 mm and the length L in the range of about 6 mm to about 9 mm.

21. An operating apparatus of a discharge lamp according to claim 19, wherein the shape of the arc tube has the length L of about 7.5 mm and the inner diameter D in the range of about 2 mm to about 4 mm.

22. An operating apparatus of a discharge lamp according to claim 10, wherein the predetermined frequency is in the range of about 100 kHz to about 200 kHz.

* * * * *